United States Patent
Rhee et al.

(10) Patent No.: US 6,783,848 B2
(45) Date of Patent: Aug. 31, 2004

(54) MATTE BIAXIALLY ORIENTED POLYPROPYLENE FILM WITH IMPROVED MATTE PROPERTY AND PROCESSABILITY

(75) Inventors: Jang-Weon Rhee, Taejon (KR); Tae-Keun Lee, Taejon (KR); Soo-Hyun Cho, Taejon (KR)

(73) Assignee: SK Corporation, Seoul (KR)

( * ) Notice: Subject to any disclaimer, the term of this patent is extended or adjusted under 35 U.S.C. 154(b) by 33 days.

(21) Appl. No.: 10/237,009

(22) Filed: Sep. 5, 2002

(65) Prior Publication Data

US 2004/0048084 A1 Mar. 11, 2004

(51) Int. Cl.[7] .............................................. B32B 27/32
(52) U.S. Cl. ....................... 428/336; 428/220; 428/515; 428/516; 428/521; 428/910
(58) Field of Search ................. 428/220, 336, 428/515, 516, 521, 910

(56) References Cited

U.S. PATENT DOCUMENTS

| | | | |
|---|---|---|---|
| 4,578,316 A | 3/1986 | Clauson et al. | 428/516 |
| 5,364,704 A | 11/1994 | Murschall et al. | 428/516 |
| 5,366,796 A | 11/1994 | Murschall et al. | 428/216 |
| 5,473,016 A | 12/1995 | Fujii et al. | 525/74 |
| 5,492,757 A | 2/1996 | Schuhmann et al. | 428/329 |
| 5,494,717 A | 2/1996 | Peiffer et al. | 428/34.9 |
| 5,496,600 A | 3/1996 | Peiffer et al. | 428/35.7 |
| 5,501,905 A | 3/1996 | Krallmann et al. | 428/339 |
| 5,516,563 A | 5/1996 | Schumann et al. | 428/34.2 |
| 6,322,894 B1 | 11/2001 | Harley et al. | 428/447 |

FOREIGN PATENT DOCUMENTS

EP    0367613    7/1999

*Primary Examiner*—D. S. Nakarani
(74) *Attorney, Agent, or Firm*—Abelman, Frayne & Schwab

(57) ABSTRACT

Disclosed is a matte biaxially oriented polypropylene film having improved matte characteristic and processability. The film comprises one or more surface layers made of a composition comprising 100 parts by weight of a resin blend of 40–60 wt % of polyethylene (I) and 60–40 wt % of polypropylene (II), 0.005–0.04 parts by weight of a peroxide (III) and 0.1–0.5 parts by weight of a fluoroelastomer or a metal stearate (IV). The matte biaxially oriented film has low gloss (45°, <10%) and high haze (>70%), and solves problems related to increase of silver (or bright) spots and roughness of a matte pattern, and a shortened die cleaning cycle due to die build-up.

9 Claims, No Drawings

MATTE BIAXIALLY ORIENTED POLYPROPYLENE FILM WITH IMPROVED MATTE PROPERTY AND PROCESSABILITY

BACKGROUND OF THE INVENTION

1. Field of the Invention

The present invention pertains, in general, to matte biaxially oriented polypropylene films having improved matte property and processability. More specifically, The present invention is directed to a matte biaxially oriented polypropylene film having low gloss (45°, <10%) and high haze (>70%), which solves problems related to increase of silver (or bright) spots and roughness of a matte pattern, and a shortened die cleaning cycle due to die build-up.

2. Description of the Prior Art

Generally, films, made from polyolefin resin balanced in terms of price and performance, are excellent in mechanical, thermal and electrical properties, and have superior chemical resistance and formability. Thus, such films have been mainly used for packaging of foods and goods, and for coating of paper and other materials, or as lamination materials. Among the films, a matte film which is able to give the film smooth feelings due to decrease of surface gloss is evaluated as a highly valuable product increasing marketability of packaging, coating or lamination materials, and has been widely used. In particular, a matte biaxially oriented film consisting mainly of polypropylene resin constitutes most polyolefin-based matte films, and has been variously used for food packaging and paper lamination.

The matte function is based on scattered reflection of light by uneven reflecting surface. The methods for providing the matte property to the film surface are classified into: (1) surface treatment such as coating and etching of the surface of a conventional film, (2) use of the difference of flowability, shrinkage and refractive index in an incompatible resin blend, (3) formation of uneven film surface using an inorganic filler and (4) embossing treatment for formation of a cooling roll having an uneven surface. In the matte biaxially oriented polypropylene film, the method described in the above (2) is mainly used. As the incompatible resin, a resin blend of polyethylene (high viscosity/low melt index) and polypropylene (low viscosity/high melt index), having a large difference in viscosity, is typically used.

In the method for providing the matte property by use of the incompatible resin blend having a large difference in flowability, as the degree of incompatibility and difference of flowability between resins in the blend becomes larger, or as a resin composition in a bi-component system approaches 50/50 wt %, the matting effect is increased. However, if the difference of flowability between the incompatible resins is too large, poor mixing and numerous fish eyes are generated upon extrusion due to large difference of viscosities. Poor mixing increases roughness of the matte pattern and fish eyes generate silver (or bright) spots of the matte film during stretching. The term "silver spot" refers to a slightly lighter portion on the film surface, while the term "bright spot" refers to a glittering portion of homo polypropylene core exposed by non-wetting of the matte resin to the skin. The silver (or bright) spots are generated due to the poor stretchability and weak interface of fish eye, tearing of interface during stretching. Such phenomena are undesirable for food packaging and paper lamination film, and decrease marketability of the materials.

In addition, when the incompatible resin blend having large difference in flowability is used to increase the matting effect, problems such as die build-up are caused. As for the die build-up, the incompatible resins flow non-uniformly owing to different flowability thereof and are deposited onto the die like impurities. Very low molecular weight components of resin blend also tend to be deposited onto the die. If the die build-up is excessive, the machine should be shut down to clean the die.

Further, the silver (or bright) spot of the matte film, roughness of the matte pattern and the die build-up are influenced by a molecular weight distribution (MWD) of the used resin. Typically, the matte property improves as the molecular weight distribution increases. However, if the MWD is too broad, increase of the silver (or bright) spots of the matte film and roughness of the matte pattern, due to high molecular weight portion, and increase of the die build-up, due to low molecular weight portion, become extreme. In particular, in the case of having a bimodal molecular weight distribution, the above problems are rendered much worse.

Therefore, as the matte biaxially oriented polypropylene film, a film having haze of 60–70% and gloss (45°) of 10–15% is typically used.

Examples of the conventional techniques disclosed to improve the properties of the matte biaxially oriented film are as follows:

WO 8910839 discloses a biaxially oriented polypropylene film comprising a heat-sealable HDPE (high density polyethylene) as a surface layer, which is advantageous in light of excellent transparency, such as low haze and high gloss, and low friction coefficient.

In U.S. Pat. No. 4,578,316, there is disclosed an oriented film structure comprising a polypropylene film having on at least one surface thereof a layer of a blend of (I) a member selected from the group consisting of a medium density polyethylene, high density polyethylene and mixtures thereof and (II) polypropylene. Such a film has advantages of low friction coefficient, and excellent printability and transparency (low haze and high gloss). As seen from the aforementioned patents, which pertains to the production of films having excellent transparency using polyolefin blend, the matte appearance of the blend not only depends on a kind of the blended polymer resin (polyethylene, polypropylene, etc.) but also a molecular weight and a molecular weight distribution (MWD) of the blended resin.

Furthermore, preparations of a matte surface layer in a biaxially oriented film using a polyolefin resin blend component are disclosed in U.S. Pat. Nos. 5,364,704, 5,366,796, 5,473,016, 5,492,757, 5,494,717, 5,496,600, 5,501,905, 5,516,563, 6,322,894, and EP Publication No. 0 367 613 B1.

In U.S. Pat. Nos. 5,364,704 and 5,366,796, there is disclosed a matte biaxially oriented film having haze value greater than 40%, comprising a resin blend having MI of 1.5–12 g/10 min (230° C.) of polyethylene having MI of 0.5–1.5 g/10 min (190° C.) and polypropylene having MI of 0.5–10 g/10 min (230° C.). But, the above film suffers from the disadvantage of not obtaining sufficient matting effect due to small MI difference between the resins.

In U.S. Pat. No. 5,473,016, there is also disclosed a matte film comprising a resin composition of propylene copolymer (component 1), very linear low density polyethylene (VLLDPE, component 2) and polyethylene resin (component 3) modified with epoxy and hydroxide groups. Optionally, inorganic fillers may be added to the resin composition. However, this film had a drawback, such as high preparation cost due to use of modified polyethylene resin and VLLDPE. Further, the addition of inorganic filler such as $CaCO_3$ to the biaxially oriented film leads to the better matting effect in the quantitative aspect, while the matte layer is peeled off and silver (or bright) spots may be generated in qualitative aspect.

In EP Publication No. 0 367 613 B1, there is also disclosed a matte film using an incompatible resin blend. As the resin, HDPE and polypropylene, having MI of 1 g/10 min or less, are used, and preferably, inorganic fillers such as $SiO_2$ may be added thereto. However, the above film is opaque due to addition of the inorganic filler, and easily has silver (or bright) spot generated upon stretching.

In U.S. Pat. No. 5,492,757, there is also disclosed a film comprising a matte layer consisting of a blend of polyethylene and polypropylene, in which polyethylene having MI of 1–50 g/10 min and polypropylene having MI of 1.5–12 g/10 min are used, and $CaCO_3$ or $TiO_2$ is added to the matte layer or the other layers, thus increasing whiteness and opacity. As for this film having excellent printability, the reduced matte property because of the resin blend having low MI difference used for the matte layer is reinforced with the added inorganic filler. But, because of the inorganic fillers used, silver (or bright) spots may be generated upon stretching and the matte property is not high due to high gloss.

In U.S. Pat. No. 5,494,717, there is also disclosed a multiplayer polypropylene film of high shrinkage having at least one matte surface comprising a mixture or blend of a homopolymer (isotactic homopolypropylene) having MI of 0.5–15 g/10 min (preferably 1.5–6.0 g/10 min) and propylene copolymer (component 1) and HDPE having MI of 0.2–50 g/10 min (ISO 1133 at 50N/190° C.), preferably 5–25 g/10 min, or a blend of HDPE and propylene copolymer (component 2). However, such a film is disadvantageous in that MI difference between two components is not large, and the film has inferior matte property owing to haze of 60–70%.

U.S. Pat. No. 5,496,600 discloses a matte twist wrapping film, using components similar to the components disclosed in U.S. Pat. No. 5,494,717 as the matte layer. In this patent, a degraded polypropylene is used for a core layer but the MI difference between the components 1 and 2 used for the matte layer is not large, and thus sufficient matte appearance cannot be exhibited. Also, haze of the above film is maximally 70%.

In U.S. Pat. No. 5,501,905, there is also disclosed a film having a matte layer consisting essentially of a resin composition of polypropylene/polyethylene block copolymer (MI 3–6 g/10 min), ethylene-based copolymer modified with a polar group (MI 3–8 g/10 min), propylene copolymer (MI 3–6 g/10 min), HDPE (MI 1–2 g/10 min) and 5% or less $SiO_2$.

In U.S. Pat. No. 5,516,563, there is also disclosed an opaque, matte film, in which similar components to those disclosed in U.S. Pat. No. 5,494,717 are used for the matte layer, and the degraded polypropylene and the inorganic filler are used for the core layer. The matte layer is formed of a mixture or blend of homopolypropylene and propylene-based copolymer (component 1) and HDPE having MI of 1.0–50 g/10 min(ISO 1133 at 50N/190° C.) or a blend of HDPE and propylene-based copolymer (component 2). However, the film has an opaque appearance due to the inorganic filler used for the core layer and optionally used for the skin layer. Also, MI difference of the components 1 and 2 used for the matte layer is not large, and sufficient matte appearance cannot be exhibited. Use of the inorganic filler in the matte layer may cause generation of silver (or bright) spot.

In U.S. Pat. No. 6,322,894, there is also disclosed a matte film having improved cuttability, in which HDPE is used for the core layer and the matte layer is made of propylene homopolymer or propylene copolymer (component 1) and ethylene homopolymer or ethylene copolymer (component 2). In this patent, polydialkylsiloxane is used to decrease die build-up, but the film does not show matte appearance including low gloss and high haze, as can be seen in the Examples of the above patent (gloss: 23–70%, haze: 3.5–41%).

SUMMARY OF THE INVENTION

Leading to the present invention, the intensive and thorough research on matte films, carried out by the present inventors aiming to solve the problems encountered in the prior arts, led to development of a matte biaxially oriented film, in which a resin having both broad and continuous molecular weight distribution is used, together with an organic peroxide, whereby problems in the conventional films having low gloss and high haze, such as increase of silver (or bright) spots, roughness of a matte pattern and die build-up, can be solved.

Therefore, it is an object of the present invention to provide a matte biaxially oriented polypropylene film having low gloss (45°, <10%) and high haze (>70%) which shows excellent matte property and processability by significantly improving problems encountered in the conventional films, such as increase of silver (or bright) spots, roughness of a matte pattern and die build-up.

In accordance with an embodiment of the present invention, there is provided a matte biaxially oriented polypropylene film, comprising one or more surface layers made of a composition comprising 100 parts by weight of a resin blend of (I) 40–60 wt % of polyethylene and (II) 60–40 wt % of polypropylene, (III) 0.005–0.04 parts by weight of a peroxide and (IV) 0.1–0.5 parts by weight of a fluoroelastomer or a metal stearate, wherein the component I is composed of a copolymer of ethylene and α-olefin containing 3–8 carbons, the copolymer having density of 0.945 g/cm$^3$ (ASTM D 1505) or more; and the component II is composed of ethylene-propylene, butene-1-polypropylene or ethylene-butene-1-propylene copolymer, the content of ethylene, butene-1 or combination thereof being 1–5 wt % based on the component II.

DETAILED DESCRIPTION OF THE INVENTION

As for preparations of commercially available biaxially oriented polypropylene films having matte characteristic, an incompatible resin blend is applied to a surface layer showing matte appearance, thereby using the difference in each of flowability, shrinkage and refractive index of the blended resins, as mentioned earlier. In particular, a blend of thermodynamically incompatible polyethylene-based and polypropylene-based resins has been widely used.

In the matte characteristic obtained from the blend of incompatible resins having large flowability difference, as the degree of incompatibility and difference of flowability of the incompatible resins becomes larger and a two-resin composition in a bi-component system approaches 50/50 wt %, the film surface becomes more uneven, thus exhibiting high matting effect. However, if the flowability difference between the incompatible resins is too large, there are problems, such as poor mixing and generation of numerous fish eyes, due to viscosity difference between the resins upon extrusion. From this, the increase of silver (or bright) spots of the matte film and roughness of the matte pattern is shown after stretch. The above problems adversely affect food packaging and paper lamination film, thus decreasing a value of the materials.

Further, when the incompatible resin blend having large flowability difference is used to increase the matting effect, the die build-up is problematic. In the case of excessive die build-up, the machine should be frequently shut down to clean the die.

In addition, as a factor affecting problems related to increase of silver (or bright) spots of the matte film, roughness of the matte pattern and die build-up, there is a molecular weight distribution. In general, the broader the molecular weight distribution, the better the matte property. But too broad molecular weight distribution results in increase of silver (or bright) spots, roughness of the matte pattern and die build-up. These drawbacks become worse in the case of showing a bimodal molecular weight distribution.

Hence, a matte biaxially oriented polypropylene film, which is commercially available, commonly has haze (ASTM D 1003) of about 60–70% and gloss (ASTD D 2457, 45°) of about 10–15%.

According to the present invention, there is provided the matte biaxially oriented polypropylene film having low gloss (ASTM D 2457, 45°, <10%) and high haze (ASTM D 1003, >70%), which is dramatically improved in terms of numbers of silver (or bright) spots, roughness of the matte pattern, and shortened die cleaning cycle due to die build-up.

The matte biaxially oriented polypropylene film according to the present invention comprises at least one surface layers made of a composition comprising 100 parts by weight of a resin blend of (I) 40–60 wt % of polyethylene and (II) 60–40 wt % of polypropylene, (III) 0.005–0.04 parts by weight of a peroxide and (IV) 0.1–0.5 parts by weight of a fluoroelastomer or a metal stearate.

With a view to provision of such a polypropylene film product having low gloss (45°, <10%) and high haze (>70%) as well as significant reduction of problems related to silver (or bright) spots generated by fish eye, rough matte pattern and die build-up, the present invention focuses on the following points.

(1) Using an organic peroxide, the effect like mixing of resins having small MI difference is obtained notwithstanding having large MI (flowability) difference, and also dispersability is enhanced;

(2) Using the resin with broad and continuous molecular weight distribution, problems related to increase of silver (or bright) spots, roughness of the matte pattern and die build-up are minimized; and (3) Using an additional additive, die build-up is reduced.

In the present invention, even though the resins with large MI (flowability) difference are mixed, the effects as in admixing of the resins with small MI difference can be obtained. For this, used is a reactive extrusion technique with the use of peroxide.

The above peroxide (III) functions as a crosslinking agent relative to polyethylene resin (I) in the extruder, thus decreasing the MI of PE resin during the extrusion. While, this component acts as a chain scissoring agent relative to polypropylene resin (II), and is responsible for increase of the MI of the polypropylene resin. When the peroxide-containing polyethylene/polypropylene resin blend is extruded, the resins have relatively small MI difference at initial mixing stage and can be mixed well. Upon the final stage of extrusion of the resins, the resins eventually have a much larger MI difference therebetween compared with the initial stage of extrusion since the crosslinking and the chain scissoring reactions are sufficiently carried out. As a result, the mixing in the final extrudate is maintained on almost the same level as in use of blend having a relatively small MI difference, while the matte performance of the final extrudate is maintained on almost the same level as in use of blend having a very large MI difference. Moreover, when the peroxide is used during the extrusion, parts of polyethylene and polypropylene are bonded together, thus increasing dispersability and rendering the matte pattern of a final blend smooth.

For instance, when the matte resin composition comprises 50 wt % of polyethylene resin having MI (ASTM D 1238, 190° C.) of 0.1 g/10 min, 50 wt % of polypropylene resin having MI (ASTM D 1238, 230° C.) of 10 g/10 min and 0.03 parts (about 300 ppm) by weight of dicumyl peroxide, a final matte layer after the extrusion can exhibit the same matting effect as in the use of polyethylene resin having MI (ASTM D 1238, 190° C.) of 0.02 g/10 min and polypropylene resin having of MI (ASTM D 1238, 230° C.) of 25 g/10 min, and is superior in disperability to the composition comprising polyethylene resin having MI (ASTM D 1238, 190° C.) of 0.02 g/10 min and polypropylene resin having MI (ASTM D 1238, 230° C.) of 25 g/10 min without peroxide. Thereby, silver (or bright) spots generated by fisy eye, rough matte pattern and die build-up can be drastically reduced.

However, peroxide remaining on the final film may cause odor. Accordingly, it is preferred that the peroxide is less than 60 seconds in half-life at 200° C. in the present invention. Examples of the peroxide are 2,5-dimethyl-2,5-di(tert-butylperoxy)hexane, di(tert-butyl)peroxide, dicumyl-peroxide or combinations thereof. As such, the peroxide is used in the amount of 0.005–0.04 parts by weight, based on 100 parts by weight of the resin blend comprising polyethylene (I) and polypropylene (II). If the amount of the peroxide is less than 0.005 parts by weight, both of the MI split effect and improvement in mixing become low. On the other hand, if the amount exceeds 0.04 parts by weight, the remaining peroxide may cause problems related to odor.

There are further required for an optimal composition selection and use of a resin composition, able to overcome the problems of silver (or bright) spots by fish eye, rough matte pattern and die build-up.

In the film having low gloss (45°, <10%) and high haze (>70%) according to the present invention, the optimal composition of the matte layer, which does not cause silver (or bright) spots, rough matte pattern and die build-up, is a resin blend comprising 40–60 wt % of polyethylene (I) and 60–40 wt % of polypropylene (II).

As such, if the component I or II falls outside of the above range, matte property of the film becomes bad. Accordingly, the larger MI difference between the components I and II is required to obtain the low gloss (45°, <10%) and high haze (>70%) comparable to those of the resin blend falling within the above range (40–60 wt % of component I and 60–40 wt % of component II). Such larger MI difference leads to decreased dispersability and generation of fish eyes by low MI polyethylene resin, from which the fish eyes cause silver (or bright) spots upon biaxial stretching.

Preferably, the component I is a copolymer of ethylene and α-olefin containing 3–8 carbons, the copolymer having density of 0.945 g/cm$^3$ (ASTM D 1505) or more. More preferable is polyethylene having a melt index (ASTM D 1238, 190° C.) of 0.1–0.5 g/10 min and a continuous molecular weight distribution of stress exponent 1.7–2.0, produced from a linear tubular reactor. The stress exponent (S.Ex.) is a value determining quantitatively the molecular weight distribution of the resin using shear thinning effect of the polymer. The extent of shear thinning may be shown using MI measured in accordance with ASTM D 1238 under a load of 2160 g and 6480 g at 190° C. An equation presenting the stress exponent is defined as follows: S.Ex.= {log(MI at 6480 g)–log(MI at 2160 g)}/{log(6480)–log(2160)}. Thus, the value of S.Ex. is proportional to the molecular weight distribution.

One of the reasons why the resin blend of polyethylene and polypropylene has matte property is that the polymer resins have different refractive indexes. The larger the difference of refractive indexes between the mixed resins, the higher the matting effect. Thus, it is preferred that the component I has density of 0.945 g/cm$^3$ or more. If the density is less than 0.945 g/cm$^3$, the difference of refractive indexes in the components I and II becomes small, thus sufficient matting effect cannot be obtained.

Preferably, MI of the component I ranges from 0.1 to 0.5 g/10 min. When the MI is below 0.1 g/10 min, initial MI difference between the components I and II is large and two components are difficult to mix together. Further, because peroxide (component III) must be used in a small amount, improvement effect of the matte pattern by the peroxide is decreased. On the other hand, when the MI of the component I is above 0.5 g/10 min, odor problems may be caused by the remaining peroxide since a large amount of peroxide should be used to obtain the desired matte property. Thus, the MI of the component I should be in the range of 0.1–0.5 g/10 min so that the film having low gloss (45°, <10%) and high haze (>70%) can be prepared and the maximum mixing effect by the component III is obtained.

In addition, a molecular weight distribution of the component I is another important parameter. In the case of narrow molecular weight distribution, a crystalline structure becomes uniform and the surface is even, thus increasing transparency in qualitative aspect. The resin having too narrow molecular weight distribution is unsuitable for use in the matte resin component. Whereas, if the distribution is too broad, the parts of high molecular weight in the resin is not mixed well with polypropylene resin (component II) having high MI, which results in fish eyes upon extrusion. Therefore, upon biaxial orientation, silver (or bright) spots are generated. On the other hand, the parts of low molecular weight in the resin cause die build-up upon extrusion, so that workability becomes poor. In view of the above, it should be recognized that the molecular weight distribution of the polyethylene resin (component I) is an important parameter to decrease generation of silver (or bright) spots and to reduce die build-up as well as to prepare the film having low gloss (45°, <10%) and high haze (>70%).

For control of the molecular weight distribution of the polyethylene resin, types and numbers of a polymerization reactor are varied. Generally, with the intention of obtaining broad molecular weight distribution, resins having different molecular weights are produced from two polymerization reactors and mixed during a preparation process. Thusly produced-product is effective in increasing the matte property of the matte resin. However, when this type of polyethylene resin is mixed with polypropylene resin with a large MI difference, due to bimodality in the polyethylene resin, fish eyes are generated in large quantities and the matte pattern becomes rough. According to the present invention, polyethylene resin having broad and continuous molecular weight distribution is employed to reduce silver (or bright) spots as well as to obtain smooth matte pattern of the film having low gloss (45°, <10%) and high haze (>70%) by overcoming the above disadvantages. In this case, the resin produced from the linear tubular reactor is applied to obtain such a broad and continuous distribution. As for the resin having broad molecular weight distribution produced from the linear tubular reactor, high molecular weight polyethylene is polymerized near an inlet of the reactor and low molecular weight resin is continuously produced toward an end portion of the reactor, different from the resin blend obtained by mixing the resins produced from two or more autoclave reactors. Thereby, continuous molecular weight distribution having no bimodality is formed in the reactor. Thusly prepared resin is broad in molecular weight distribution and can exhibit sufficient matte appearance. As well, the matte pattern is smooth and generation of silver (or bright) spots is decreased.

A broadness of molecular weight distribution is also very important parameter to overcome the above problems, along with pattern of the distribution. Using shear thinning effect of the resin, relative difference between viscosities of the resins under low shear and high shear can demonstrate the extent of the molecular weight distribution. In the present invention, the stress exponent as mentioned above is used. Preferably, S.Ex. of the polyethylene ranges from 1.7 to 2.0. If S.Ex. of polyethylene is less than 1.7, the molecular weight distribution is not sufficiently broad and the desired matting effect cannot be obtained. On the other hand, when polyethylene having S.Ex. larger than 2.0 is mixed with polypropylene resin, the high molecular weight resin in the distribution is difficult to be mixed well with polypropylene resin. Thus, by the generated fish eyes, numerous silver (or bright) spots are finally formed on the matte biaxially oriented polypropylene film.

Meanwhile, the component II is composed of ethylene-propylene, butene-1-polypropylene, or ethylene-butene-1-propylene copolymer, the content of ethylene, butene-1 or combination thereof being 1–5 wt % based on the component II. Among them, polypropylene having a melt index (ASTM D 1238, 230° C.) of 8–30 g/10 min is preferably used. The resin having low crystallinity due to the contained comonomer renders the matte pattern smooth. If the content of the comonomer is less than 1 wt %, such an effect cannot be obtained. However, increase of the content of the comonomer leads to decrease of haze and increase of gloss. Thus, to produce the film having low gloss (45°, <10%) and high haze (>70%), it is preferred that the comonomer content is limited at 5 wt % or less in the component II.

The die build-up of the matte layer resin is attributable to inherent thermodynamic incompatibility between the components in the resin composition. Such a resin composition experiences a melt flow fluctuation during the extrusion, thus causing the die build-up. According to the present invention, this phenomenon is effectively suppressed by adding a fluoroelastomer or a metal stearate (component IV). The fluoroelastomer is exemplified by vinylidene fluoride-hexafluoropropene polymer, while the metal stearate is exemplified by zinc stearate, magnesium stearate, calcium stearate or combinations thereof. As such, the component IV is added in the amount of 0.1–0.5 parts by weight. When the content is less than 0.1 parts by weight, the desired effect is not shown. Meanwhile, when the content exceeds 0.5 parts by weight, there are problems of deteriorated printability and stained film by migration of the component IV to the surface. These additives decrease the die build-up but do not eliminate the build-up completely. The control of the molecular weight distribution should be run parallel with use of the additive.

The layer structure of the matte biaxially oriented film according to the present invention comprises one or more surface layers (matte layers), made of the resin composition comprising the above components I to IV. At this time, it is preferred that the surface layer after stretching is in the range of about 1.0–5.0 μm thick. If the thickness of the surface layer is less than 1.0 μm, the surface is not sufficiently rough and thus the matting effect is decreased. On the other hand, if the thickness exceeds 5.0 μm, productivity is decreased due to lack of stretchability. Also, it should be noted that increasing the thickness of matte layer hardly affects improvement of the matte property of the film, itself.

As described above, the matte biaxially oriented film in accordance with this invention has haze of 70% or more and gloss (45°) of 10% or less, and solves problems related to increase of silver (or bright) spots, roughness of the matte pattern and die build-up in the film.

Having generally described this invention, a further understanding can be obtained by reference to certain specific examples which are provided herein for purposes of illustration only and are not intended to be limiting unless otherwise specified.

EXAMPLE

As shown in the following Table 1, a resin composition comprising the component I, II, III and IV was prepared using 90 φ twin screw compounder (compounding temperature: 180–240° C.). A matte biaxially oriented three-layered film was prepared and properties thereof were determined as follows. The results are presented in Table 2, below.

As for the layer structure of the film, the resin blend was used for one skin layer, and general homo polypropylene for biaxially oriented polypropylene (BOPP) of MI=3.0 g/10 min (ASTM D 1238, 230° C.) was used for a core layer and the other skin layer.

As for film forming such as sheet preparation/stretch, commercially available three-layer BOPP preparation line of Bruckner GmbH (German) was used. The stretch ratio was 48 times (machine direction 6 times and transverse direction 8 times), and line speed was 220 m/min. The produced film had a final thickness of 18 μm. The film was 8 m wide.

The haze of the film was measured in accordance with ASTM D 1003, and the gloss in accordance with ASTM D 2457 (45°).

A die cleaning cycle means a time period required to shut down the operation of the machine to clean the die, since film formation cannot be continuously performed due to accumulated die build-up.

The number of silver spot (slightly light portion on the film surface due to poor mixing of resins) was observed with the naked eye using a black plate as a background. The number of bright spots (glittering portion by exposed homo PP in the core due to the poor wetting of the matte resins to the skin) was observed with the naked eye using general fluorescent light as a background. Each was evaluated in terms of the numbers per 600 cm².

The appearance of the matte surface layer was observed with the naked eye and classified into three grades, in which the film having the smoothest matte pattern is indicated as "excellent", and the film having the roughest matte pattern is indicated as "poor".

Example A1

As the component I, use was made of polyethylene having MI=0.3 g/10 min (ASTM D 1238, 190° C.), density=0.953 g/cm³ (ASTM D 1505), S.Ex. of 1.85 and a continuous molecular weight distribution. As the component II, polypropylene was used, which had MI=18 g/10 min (ASTM D 1238, 230° C.) and an ethylene content of 3.5%. A weight fraction of the components I and II was 50/50. As the component III, 200 ppm of 2,5-dimethyl-2,5-di(tert-butylperoxy)hexane was added and 2000 ppm of calcium stearate was used as the component IV.

The film was prepared in a three-layered structure. In the layered structure, a resin blend composition comprising the components I to IV was used as one skin layer, and to a core layer and the other skin layer, a general homo polypropylene for production of BOPP of MI=3.0 (ASTM D 1238, 230° C.) was used. The produced film had a final thickness of 18 μm, and a matte skin layer was 2 μm thick.

Example A1-2

The procedure of Example A1 was repeated, and the film having a matte skin layer of 1 μm was manufactured.

Example A2

The film having a final thickness of 18 μm and a 2 μm thick matte skin layer was prepared in the same manner as in Example A1, except that the weight fraction of the components I and II was adjusted to 40/60.

Example A3

The film having a final thickness of 18 μm and a 2 μm thick matte skin layer was prepared in the same manner as in Example A1, except that polypropylene having MI=8.0 g/10 min and the ethylene content of 3.5% was used as the component II.

Example A4

The film having a final thickness of 18 μm and a 2 μin thick matte skin layer was prepared in the same manner as in Example A1, except that polypropylene having MI=29.0 g/10 min and the ethylene content of 3.5% was used as the component II.

Example A5

The film having a final thickness of 18 μm and a 2 μm thick matte skin layer was prepared in the same manner as in Example A1, except that the component III was used in the amount of 400 ppm.

Comparative Example B1

The film having a final thickness of 18 μm and a 2 μm thick matte skin layer was prepared in the same manner as in Example A1, except that as the component I, use was made of PE (MI=0.05 g/10 min, density=0.956 g/cm³, S.Ex.=1.89) having a bimodal molecular weight distribution, instead of a continuous molecular weight distribution.

Comparative Example B2

The film having a final thickness of 18 μm and a 2 μm thick matte skin layer was prepared in the same manner as in Example A1, except that the component III was not used.

Comparative Example B3

The film having a final thickness of 18 μm and a 2 μm thick matte skin layer was prepared in the same manner as in Comparative Example B1, except that the component III was not used.

Comparative Example B4

The film having a final thickness of 18 μm and a 2 μm thick matte skin layer was prepared in the same manner as in Example A1, except that as the component I, use was made of PE (MI=0.3 g/10 min, density=0.963 g/cm$^3$, S.Ex.=1.68) having a non-continuous molecular weight distribution and a bimodal molecular weight distribution.

Comparative Example B5

The film having a final thickness of 18 μm and a 2 μm thick matte skin layer was prepared in the same manner as in Example A1, except that, as the component I, a medium density PE was used. As such, the used PE had a continuous molecular weight distribution, and MI=0.3 g/10 min, density=0.941 g/cm$^3$, S.Ex.=1.70.

Comparative Example B6

The film having a final thickness of 18 μm and a 2 μm thick matte skin layer was prepared in the same manner as in Example A1, except that, as the component II, homo polypropylene having MI=25 g/10 min and containing no comonomer therein was used.

Comparative Example B7

The film having a final thickness of 18 μm and a 2 μm thick matte skin layer was prepared in the same manner as in Example A1, except that the component IV was not used.

Comparative Example B8

The film having a final thickness of 18 μm and a 2 μm thick matte skin layer was prepared in the same manner as in Example A1, except that, as the component I, PE having MI=5.0 g/10 min, density=0.968 g/cm$^3$, S.Ex.=1.30 was used, and homo polypropylene having MI=3.0 g/10 min was used as the component II, and the component III was not used.

TABLE 1

| | | | Example | | | | | Comparative Example | | | | | | | |
|---|---|---|---|---|---|---|---|---|---|---|---|---|---|---|---|
| | | | A1 | A2 | A3 | A4 | A5 | B1 | B2 | B3 | B4 | B5 | B6 | B7 | B8 |
| Com. I | | MI (g/10 min) | 0.3 | 0.3 | 0.3 | 0.3 | 0.3 | 0.05 | 0.3 | 0.05 | 0.3 | 0.3 | 0.3 | 0.3 | 5.0 |
| | | Den. (g/cm$^3$) | 0.953 | 0.953 | 0.953 | 0.953 | 0.953 | 0.956 | 0.953 | 0.956 | 0.963 | 0.941 | 0.953 | 0.953 | 0.968 |
| | M W D | S. Ex. | 1.85 | 1.85 | 1.85 | 1.85 | 1.85 | 1.89 | 1.85 | 1.89 | 1.68 | 1.70 | 1.85 | 1.85 | 1.30 |
| | | Con. (C) / Bi. (B) | C | C | C | C | C | B | C | B | B | C | C | C | C |
| | | Wt %[1] | 50 | 40 | 50 | 50 | 50 | 50 | 50 | 50 | 50 | 50 | 50 | 50 | 50 |
| Com. II | | MI (g/10 min) | 18 | 18 | 8.0 | 29 | 18 | 18 | 18 | 18 | 18 | 18 | 25 | 18 | 3.0 |
| | | Comono. (C$_2$) (wt %) | 3.5 | 3.5 | 3.5 | 3.5 | 3.5 | 3.5 | 3.5 | 3.5 | 3.5 | 3.5 | 0.0 | 3.5 | 0.0 |
| | | wt %[1] | 50 | 60 | 50 | 50 | 50 | 50 | 50 | 50 | 50 | 50 | 50 | 50 | 50 |
| Com. III | | Peroxide[2] (ppm) | 200 | 200 | 200 | 200 | 400 | 200 | 0.0 | 0.0 | 200 | 200 | 200 | 200 | 0.0 |
| Com. IV | | Metal Stearate[3] (ppm) | 2,000 | 2,000 | 2,000 | 2,000 | 2,000 | 2,000 | 2,000 | 2,000 | 2,000 | 2,000 | 2,000 | 0.0 | 2,000 |

Note:
[1] content in resin blend (wt %)
[2] 2,5-dimethyl-2,5-di(tert-butylperoxy)hexane
[3] calcium stearate

TABLE 2

| | Example | | | | | | Comparative Example | | | | | | | |
|---|---|---|---|---|---|---|---|---|---|---|---|---|---|---|
| | A1 | A1-2 | A2 | A3 | A4 | A5 | B1 | B2 | B3 | B4 | B5 | B6 | B7 | B8 |
| Matte Skin Layer (μm) | 2 | 1 | 2 | 2 | 2 | 2 | 2 | 2 | 2 | 2 | 2 | 2 | 2 | 2 |
| Haze (%) | 81 | 72 | 71 | 72 | 85 | 85 | 87 | 60 | 83 | 82 | 68 | 82 | 81 | 3.0 |
| Gloss (%) | 4.5 | 9.5 | 10.0 | 9.8 | 4.2 | 4.1 | 4.0 | 17.0 | 4.3 | 4.5 | 15.0 | 4.2 | 4.5 | 60 |
| Silver Spot No. (#/ 600 cm$^2$) | 0.3 | 0.2 | 0.2 | 0.2 | 1 | 2 | >50 | 0.3 | >50 | 10 | 1 | 2 | 0.3 | 0 |
| Bright Spot No. (#/ 600 cm$^2$) | 0 | 0 | 0 | 0 | 0.5 | 1 | 15 | 0 | 6 | 1 | 0 | 2 | 0 | 0 |
| Matte Pattern* | E | E | E | E | E | E | P | F | P | P | F | F | E | — |
| Die Cleaning Cycle (hrs) | 14 | 20 | 18 | 16 | 12 | 12 | — | — | — | — | — | — | 6 | — |

Note:
*(E) excellent (F) fair (P) poor

As shown in Table 1, it can be seen that the matte biaxially oriented polypropylene film according to the examples of the present invention has lower gloss (45°, <10%) and higher haze (>70%), compared to the film according to the comparative examples. As well, in the films of the examples, the generated silver or bright spot number was small, and the matte pattern was uniformly smooth, and die build-up generation was decreased, thus relatively lengthening the die cleaning cycle.

As described above, the matte biaxially oriented polypropylene film according to the present invention can be provided, which is advantageous in light of low gloss (45°, <10%) and high haze (>70%), and decreased silver (or bright) spot, uniformly smooth matte pattern and relatively reduced die build-up, compared to the conventional matte biaxially oriented films.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A matte biaxially oriented polypropylene film, comprising at least one matte surface layer made of a composition comprising 100 parts by weight of a resin blend of (I) 40–60 wt % of polyethylene and (II) 60–40 wt % of polypropylene, (III) 0.005–0.04 parts by weight of a peroxide and (IV) 0.1–0.5 parts by weight of a fluoroelastomer or a metal stearate, wherein the component I is composed of a copolymer of ethylene and α-olefin containing 3–8 carbons, the copolymer having density of 0.945 g/cm$^3$ (ASTM D 1505) or more; and the component II is composed of ethylene-propylene, butene-1-polypropylene, or ethylene-butene-1-propylene copolymer, the content of ethylene, butene-1 or combination thereof being 1–5 wt % based on the component II.

2. The film as defined in claim 1, wherein the component I has a melt index (ASTM D 1238, 190° C.) of 0.1–0.5 g/10 min and stress exponent of 1.7–2.0, and is produced from a linear tubular reactor, thus having a continuous molecular weight distribution.

3. The film as defined in claim 1, wherein the component II has a melt index (ASTM D 1238, 230° C.) of 8–30 g/10 min.

4. The film as defined in claim 1, wherein the matte surface layer of the film is 1.0–5.0 μm thick.

5. The film as defined in claim 1, wherein the film has haze of 70% or more and gloss (45°) of 10% or less.

6. The film as defined in claim 1, wherein the component III is less than 60 seconds in half-life at 200° C.

7. The film as defined in claim 6, wherein the component III is 2,5-dimethyl-2,5-di(tert-butylperoxy)hexane, di(tert-butyl)peroxide, dicumyl-peroxide or combinations thereof.

8. The film as defined in claim 1, wherein the fluoroelastomer is vinylidene fluoride-hexafluoropropene polymer.

9. The film as defined in claim 1, wherein the metal stearate is zinc stearate, magnesium stearate, calcium stearate or combinations thereof.

* * * * *